ELSON & SCHAEFER.
Breech Loading Fire Arm.
No. 86,378.
Patented Feb. 2, 1869.
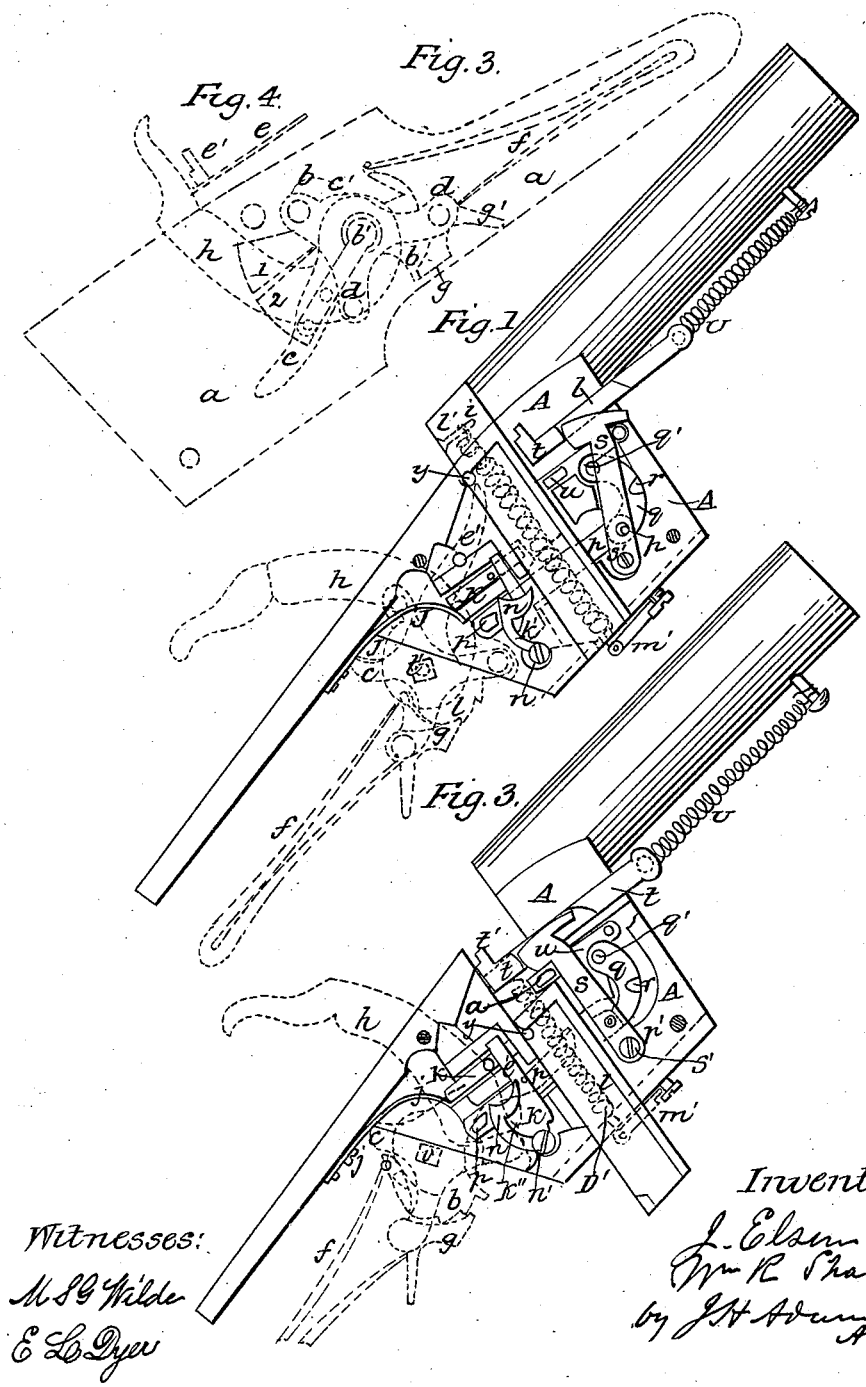
Witnesses:
M. S. G. Wilde
E. L. Dyer
Inventor:
J. Elson
Wm. R. Schaefer
by J. H. Adams
Attys.

JULIUS ELSON AND WILLIAM R. SCHAEFER, OF BOSTON, MASSACHUSETTS.

Letters Patent No. 86,378, dated February 2, 1869.

IMPROVEMENT IN BREECH-LOADING FIRE-ARMS.

The Schedule referred to in these Letters Patent and making part of the same.

Be it known that we, JULIUS ELSON and WILLIAM R. SCHAEFER, of Boston, in the county of Suffolk, and State of Massachusetts, have invented a new and useful Improvement in Breech-Loading Fire-Arms, of which the following is a full, clear, and exact description, reference being had to the accompanying drawings, making a part of this specification, in which—

Figure 1 represents a view of the mechanism with the lock-plate removed, and in position for discharging.

Figure 2 is a view of the same, showing a change of the parts, at nearly half cock.

Figure 3 represents the lock-plate and lock, with the operating-spring and spur.

Figure 4 is a detail view of the operating-spring and spur.

The object of our invention is to produce a simple and effective breech-loading fire-arm, to be operated chiefly by levers, and so that it can be very rapidly discharged; and The invention consists of a peculiarly-formed nut, provided with a lever, having an aperture, in which a spur, forming a part of a spring, plays, the said spur being so arranged as to operate the levers which move the breech-block and extractor.

The invention also consists in a peculiar construction and arrangement of levers and slides, by which great compactness, and ease, and precision of operation are attained.

Referring to the drawings—

$a$ represents the lock-plate, to which are attached the nut $b$, the dog or sere $g$, and the spring $f$, all arranged and operating in connection with the hammer $h$, as in a common gun-lock.

The nut $b$ is constructed with an elongation, $c$, forming a lever, and extending forward.

Between the lock-plate and the nut $b$ is placed a spring, provided with a spur or projection, as shown in fig. 4, which spur passes through an aperture in the elongation $c$.

A represents the housing, containing all the operating-parts.

$i$ is the breech-block, in which is arranged a coiled spring, $l$, properly secured at the top and bottom.

The breech-block is held in a closed position by means of a slide, $k$, which is pressed forward by a spring, $j$.

On the slide $k$ is a projection, by which it is pressed back by the lever $k'$.

The lever $k'$ has a projection, $k''$, which is operated by the spur $l'$ pressing it backward against the projection on the slide $k$, thus liberating the breech-block, and allowing it to descend.

$n$ is a lever, of the form shown, which is also operated by the spur $l'$, for the purpose of moving the extractor.

The upper portion of the lever $n$ has a curved bevelled edge, so as to allow the spur $l'$ to pass over it, as the lever $c$, of nut $b$, descends.

While the piece is discharging, the lever $n$ presses against a projection on the rear of the slide $p$, which latter extends forward through the breech-block, and is provided with a stud or pin, $p'$.

Upon the pin $p'$ is fitted a curved lever, $q$, having a projection, $r$, which presses against the lever $s$, for the purpose of giving the first impulse to the said lever in operating the extractor.

The lever $s$, which acts directly on the extractor-slide, is provided with an enlarged opening, fitting over the pin $p'$, so as to continue the movement begun by the projection $r$, of lever $q$, to its full extent.

$t$ is a slide, carrying the extractor $t'$, properly adapted to engage with the rim of the cartridge, and is retracted and held in position by a coiled spring, $v$, as shown.

$u$ $u$ is a slide, placed under and operated by the lever $s$, and has a projection at each end, and serves the purpose of temporarily checking the upward movement of the breech-block at the moment of extracting the cartridge.

The operation is as follows:

When the gun is to be loaded, the hammer is set at half cock, in doing which the spur $l'$ is made to move the lever $k'$, which in turn draws back the bolt $k$, thus liberating the breech-block $i$, the breech-block being drawn down by the spring $l$, and thus opening the breech.

The spur $l'$ then acts on the lever $n$, which presses against the projection of the slide $p$, moving the same backward, and carrying with it the lever $q$, the projection, $r$, of which presses against the lever $s$, and gives the first impulse to the movement of the extractor.

The movement of the lever $s$ is then continued by the action of the pin $p'$, so as to operate the extractor.

Toward the latter part of the movement of the lever $s$, the slide $u$ is moved so as to engage with a projecting edge of the breech-block, and check its upward movement, in order to prevent it from coming in contact with the retractor-slide or the cartridge-shell, all as shown in fig. 2.

The spur $l'$ having passed over the end of the lever $n$, the latter is set free, which allows the extractor and all its connections to return to their original positions. The cartridge is then inserted, and the hammer is set at full cock, in doing which, the end of the lever $c$ moves against the projection $y$, on the breech-block, carrying the latter up to its full extent, when the slide $k$ is pressed forward into a recess in the breech-block, and holds the latter firmly in position.

As the hammer falls, in discharging the gun, the spur $l'$ being bevelled on its end, and united to the spring $l$, is enabled to pass freely over the levers $n$ and $k'$, to its first position.

What we claim as new, and desire to secure by Letters Patent, is—

1. The nut $b$, provided with the lever $c$, in combination with the spring $l$, and its projecting spur $l'$, as and for the purpose set forth.

2. The bolt $k$, in combination with the lever $k'$ and the spur $l'$, as and for the purpose described.

3. The lever $n$, constructed as described, in combination with the slide $p$, and operated by the spur $l'$, as set forth.

4. The combination of the slide $p$, the curved lever $q$. provided with the projection $r$, and the lever $s$, as specified.

5. The slide $u$, in combination with the lever $s$ and the breech-block $i$, as and for the purpose specified.

In testimony whereof, we have signed our names to this specification, in the presence of two subscribing witnesses.

JULIUS ELSON.
WM. R. SCHAEFER.

Witnesses:
J. H. ADAMS,
M. S. G. WILDE.